US008457191B2

(12) United States Patent
Cajegas, III et al.

(10) Patent No.: US 8,457,191 B2
(45) Date of Patent: Jun. 4, 2013

(54) ADAPTIVE EQUALIZER AND RELATED METHODS

(75) Inventors: Lazaro F. Cajegas, III, Mesa, AZ (US); Cris M. Mamaril, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 827 days.

(21) Appl. No.: 12/045,285

(22) Filed: Mar. 10, 2008

(65) Prior Publication Data
US 2009/0285278 A1 Nov. 19, 2009

Related U.S. Application Data

(60) Provisional application No. 60/957,972, filed on Aug. 24, 2007.

(51) Int. Cl.
*H04L 27/01* (2006.01)

(52) U.S. Cl.
USPC .................. 375/235; 375/232; 375/229

(58) Field of Classification Search
USPC ............................................ 375/235
See application file for complete search history.

(56) References Cited

U.S. PATENT DOCUMENTS

| | | | |
|---|---|---|---|
| 5,381,357 A | 1/1995 | Wedgewood et al. | |
| 5,684,827 A | 11/1997 | Nielsen | |
| 5,805,619 A * | 9/1998 | Gardner et al. | 714/814 |
| 6,301,298 B1 | 10/2001 | Kuntz et al. | |
| 6,654,432 B1 * | 11/2003 | O'Shea et al. | 375/354 |
| 6,721,371 B1 * | 4/2004 | Barham et al. | 375/316 |
| 6,922,436 B1 * | 7/2005 | Porat et al. | 375/222 |
| 7,254,188 B2 | 8/2007 | Cannon et al. | |
| 2005/0220185 A1 * | 10/2005 | Dowling | 375/232 |
| 2008/0292010 A1 * | 11/2008 | Wernears | 375/260 |

* cited by examiner

*Primary Examiner* — Kenneth Lam
*Assistant Examiner* — Michael Neff
(74) *Attorney, Agent, or Firm* — Booth Udall Fuller, PLC

(57) ABSTRACT

An adaptive equalizer. Implementations of adaptive equalizers may include implementations of 8-QAM adaptive equalizers that may include a signal filter, an adaptive processor coupled to the signal filter and a slicer coupled to the signal filter and the adaptive processor. The slicer may be configured to utilize a plurality of desired signals corresponding to an 8-QAM signal constellation having four quadrants, four levels disposed along the I-axis, and three levels disposed along the Q-axis. The slicer may also be configured to output an error signal by receiving an equalized output signal, processing the equalized output signal by correlating the equalized output signal with a decision region within one of the four quadrants, selecting one of a plurality of desired signals corresponding to the decision region, and calculating the error signal using the desired signal and the equalized output signal.

21 Claims, 9 Drawing Sheets

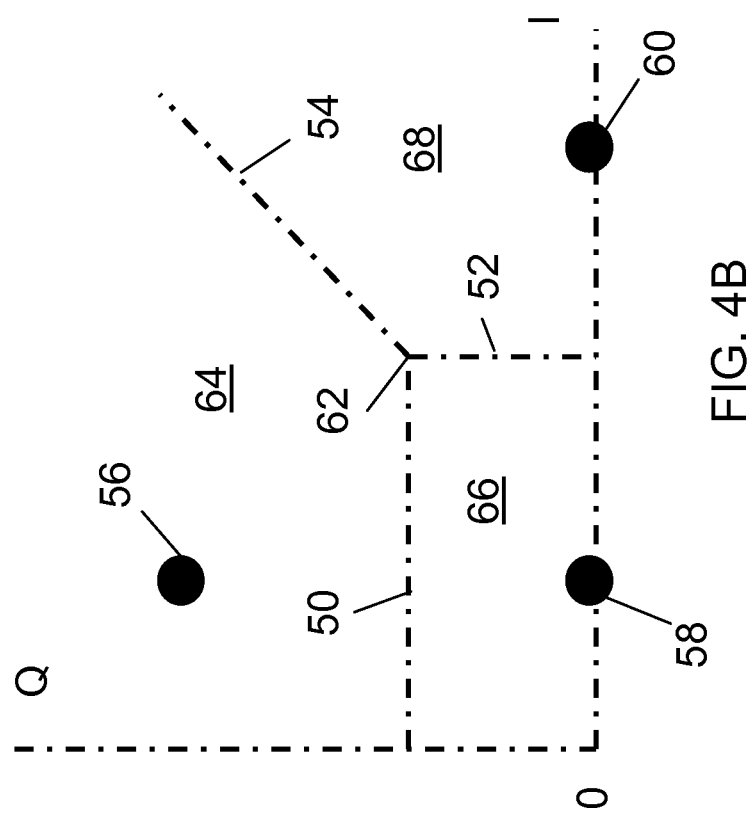

ADAPTIVE EQUALIZER AND RELATED METHODS

CROSS REFERENCE TO RELATED APPLICATIONS

This document claims the benefit of the filing date of U.S. Provisional Patent Application 60/957,972, entitled "8-QAM Adaptive Equalizer" to Cajegas III, et al, which was filed on Aug. 24, 2007, the disclosure of which is hereby incorporated entirely herein by reference.

BACKGROUND

1. Technical Field

Aspects of this document relate generally to adaptive equalizers for use in telecommunications.

2. Background Art

Wireless telecommunication systems often involve transmission of data using electromagnetic waves. Transmission of data is often accomplished by modulating the amplitude, the frequency, and/or, in the case when data is communicated by multiple waves simultaneously, the phase relationship between the transmitted waves. Typical wireless telecommunication systems include receivers that often include a wide variety of circuit components designed to process received electromagnetic waves and retrieve the data information transmitted. Some of these components may include various filters and equalizers designed to handle signal processing and signal noise.

SUMMARY

Implementations of adaptive equalizers may include implementations of 8-QAM adaptive equalizers and may include a signal filter, an adaptive processor coupled to the signal filter and a slicer coupled to the signal filter and the adaptive processor. The slicer may be configured to utilize a plurality of desired signals corresponding to an 8-QAM signal constellation having four quadrants, four levels disposed along the I-axis, and three levels disposed along the Q-axis. The slicer may also be configured to output an error signal by receiving an equalized output signal, processing the equalized output signal by correlating the equalized output signal with a decision region within one of the four quadrants, selecting one of a plurality of desired signals corresponding to the decision region, and calculating the error signal using the desired signal and the equalized output signal.

Implementations of adaptive equalizers may include, one, all, or some of the following:

The slicer may be configured to calculate the error signal by subtracting the equalized error signal from the desired signal.

The slicer may be configured to correlate the equalized output signal with the decision region by determining with which one of the four quadrants the equalized output signal corresponds and by comparing an I-axis value and a Q-axis value of the equalized output signal with one or more quadrant thresholds corresponding to the determined quadrant.

Implementations of adaptive equalizers may utilize a method of designing a slicer for an adaptive equalizer, which may be an 8-QAM adaptive equalizer in particular implementations. The method may include folding an 8-QAM signal constellation to a quadrant, creating one or more decision regions within the quadrant by determining a value of one or more quadrant thresholds, and storing the value of the one or more quadrant thresholds for use by the slicer.

Implementations of a method of designing a slicer for an adaptive equalizer may include one, all, or some of the following.

The quadrant may be a first quadrant and the value may be a value of one or more first quadrant thresholds.

The quadrant may be one of a second quadrant, a third quadrant, and a fourth quadrant and the value may be one of a value of one or more second quadrant thresholds, a value of one or more third quadrant thresholds, and a value of one or more fourth quadrant thresholds.

The method may also include folding the signal constellation to the second quadrant and creating one or more decision regions within the second quadrant by determining the value of one or more second quadrant thresholds; folding the signal constellation to the third quadrant and creating one or more decision regions within the third quadrant by determining the value of one or more third quadrant thresholds; folding the signal constellation to the fourth quadrant and creating one or more decision regions within the fourth quadrant by determining the value of one or more fourth quadrant thresholds. The method may also include storing the value of the one or more first quadrant thresholds, the value of the one or more second quadrant thresholds, the value of the one or more third quadrant thresholds, and the value of the one or more fourth quadrant thresholds.

Two or more of two or more quadrant thresholds may meet at a single I-axis value and a single Q-axis value.

The value of the one or more quadrant thresholds may include a single I-axis value for a plurality of Q-axis values.

The value of the one or more quadrant thresholds may include a single Q-axis value for a plurality of I-axis values.

The value of the one or more quadrant thresholds may be a function of both I-axis and Q-axis values.

The function of both I-axis and Q-axis values may be linear.

Implementations of adaptive equalizers (including 8-QAM adaptive equalizers) may utilize a method of using a slicer. The method may include receiving an equalized output signal from an FIR filter of an 8-QAM adaptive equalizer and selecting a decision region that corresponds with the equalized output signal from a plurality of decision regions by comparing the equalized output signal with a plurality of values of quadrant thresholds. The method may also include selecting a desired signal that corresponds with the selected decision region from a plurality of desired signals mapped to the plurality of decision regions and calculating an error signal for an adaptive equalizer (including an 8-QAM adaptive equalizer) by subtracting the equalized output signal from the selected desired signal.

Implementations of a method of using a slicer in an adaptive equalizer may include one, all, or some of the following.

Comparing the equalized output signal with a plurality of values of quadrant thresholds may include determining with which quadrant the equalized output signal corresponds.

Determining which quadrant the equalized output signal corresponds may include retrieving one or more values of quadrant thresholds corresponding to the quadrant with which the equalized output signal corresponds.

Selecting the plurality of decision regions by comparing the equalized output signal with a plurality of values of quadrant thresholds may include comparing an I-axis value and a Q-axis value of the equalized output signal with one or more I-axis values and one or more Q-axis values of the plurality of values of quadrant thresholds.

The method may include sending the error signal to an adaptive processor.

Implementations of adaptive equalizers may utilize a method of calculating an error signal for an adaptive equalizer (including an 8-QAM adaptive equalizer). The method may include providing a plurality of desired signals corresponding to an 8-QAM signal constellation having four quadrants, four levels disposed along the I-axis, and three levels disposed along the Q-axis. The method may also include receiving an equalized output signal, processing the equalized output signal by correlating the equalized output signal with a decision region within one of the four quadrants, selecting one of a plurality of desired signals corresponding to the decision region, and calculating an error signal using the desired signal and the equalized output signal.

Implementations of a method of calculating an error signal for an adaptive equalizer may include one, all, or some of the following.

Calculating the error signal may include subtracting the equalized output signal from the desired signal.

Correlating the equalized output signal with a decision region may include determining with which one of the four quadrants the equalized output signal corresponds and comparing an I-axis value and a Q-axis value of the equalized output signal with one or more quadrant thresholds corresponding to the determined quadrant.

The method may include transmitting the error signal to an adaptive processor.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4B illustrates threshold values bounding three decision regions in the first quadrant of the folded signal constellation illustrated in FIG. 4A;

DESCRIPTION

This disclosure, its aspects and implementations, are not limited to the specific components or assembly procedures disclosed herein. Many additional components and assembly procedures known in the art consistent with the intended adaptive equalizer and/or assembly procedures for an adaptive equalizer will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such adaptive equalizers and implementing components, consistent with the intended operation.

Implementations of adaptive equalizers may be utilized in telecommunications receivers, such as, by non-limiting example, satellite receivers, wireless receivers, modems, network interface devices, and any other device capable of receiving a telecommunication signal. Adaptive equalizers are "adaptive" because they are used to adjust, or adapt, parameters in an internal filter that serves to handle noise in a received telecommunication signal. Implementations of adaptive equalizers disclosed in this document may be used to minimize a wide variety of distortion, such as, by non-limiting example, linear distortion, channel distortion, and any other type of distortion or interruption of an electromagnetic signal. Examples of telecommunications systems incorporating 8-QAM is described in U.S. Pat. No. 7,254,188 to Cannon et al. entitled "Method and System for Modulating and Detecting High Datarate Symbol Communications," issued Aug. 7, 2007; U.S. Pat. No. 5,381,357 to Wedgewood et al. entitled "Complex Adaptive FIR Filter," issued Jan. 10, 1995; U.S. Pat. No. 5,684,827 to Nielsen entitled "System for Controlling the Operating Mode of an Adaptive Equalizer," issued Nov. 4, 1997; and U.S. Pat. No. 6,301,298 to Kuntz et al. entitled "Adaptive Equalizer with Complex Signal Regeneration and Method of Operation," issued Oct. 9, 2001, the relevant disclosures of which are hereby incorporated entirely herein by reference.

Figure 1:
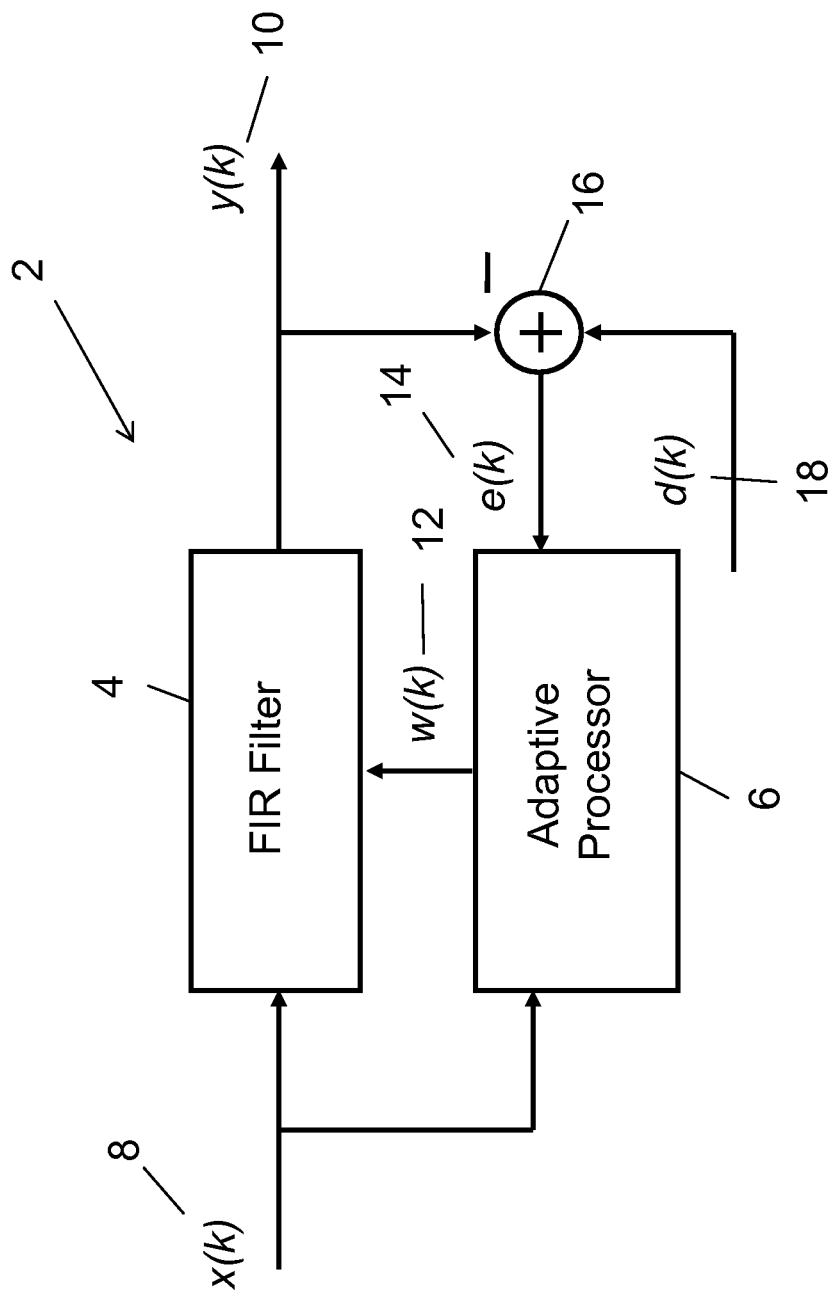
FIG. 1 is a block diagram of an implementation of an adaptive equalizer.

Referring to FIG. 1, a block diagram of an implementation of an adaptive equalizer 2 is illustrated. As illustrated, the adaptive equalizer 2 includes a finite impulse response filter (FIR) 4 coupled to an adaptive processor 6. The adaptive equalizer 2 receives an unequalized signal 8 ($x(k)$) and processes it through the FIR 4 to produce an equalized output signal 10 ($y(k)$). As illustrated, the FIR 4 is made adaptive by receiving new filter weights 12 ($w(k)$) from the adaptive processor 6. The adaptive processor 6 calculates new filter weights 12 by using an error signal 14 ($e(k)$). The error signal 14 is supplied by a slicer 16 which calculates the error signal 14 by using a sample of the equalized output signal 10 and a desired signal 18 ($d(k)$). The signals processed by the adaptive equalizer 2 may include complex and real terms to allow for digital equalization.

Figure 2B:
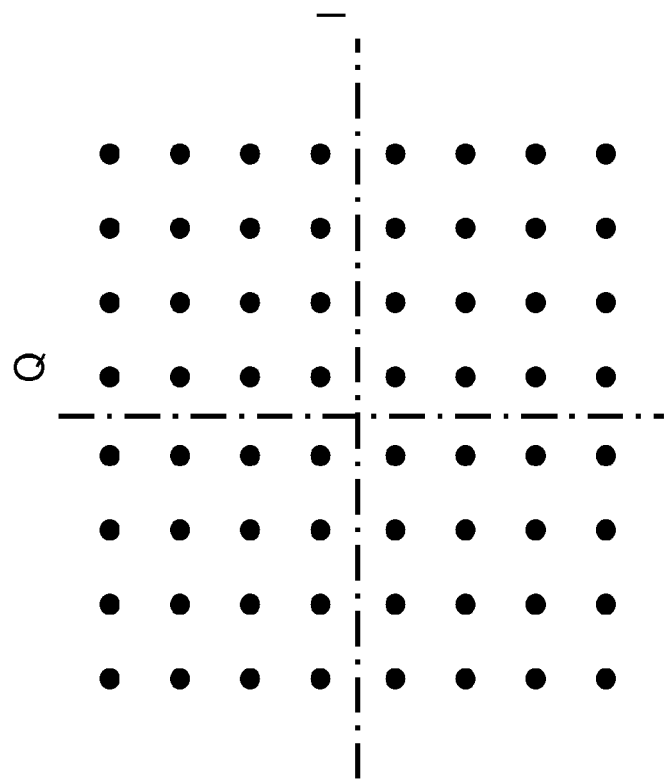
FIG. 2B is a signal constellation of an implementation of a 64-QAM digital communication system.

Implementations of adaptive equalizers 2 may be incorporated into quadrature amplitude modulation (QAM) systems. QAM systems transmit data in the form of symbols that include at least one bit using amplitude modulation of two carrier waves that are out of phase by 90 degrees, or in quadrature. Because the signals used in QAM systems include complex and real terms, the possible symbols that can be transmitted in various implementations of QAM systems can be represented by constellation diagrams. Referring to FIG. 2A, an implementation of the constellation diagram for an implementation of a 16-QAM system is illustrated. As illustrated, the constellation diagram contains 16 possible symbol types, each represented by a "coordinate" point location in real (I-axis) and imaginary (Q-axis) space. Particular implementation of 16-QAM systems have symbols that include four bits. The arrangement of the 16 symbols may also be encoded in Gray code to further render the system more robust and limit confusion between adjacent symbols caused by noise. FIG. 2B illustrates an implementation of a constellation diagram for a 64-QAM system.

As illustrated in FIGS. 2A and 2B, many conventional QAM systems utilize constellation diagrams that are symmetric or, in other words, contain the same number of levels along the I-axis as they do along the Q-axis. Because the constellation diagrams of such systems are symmetric, it is relatively easy to implement the slicer 16, because the symmetry allows the slicer 16 to use a look up table (LUT) to match a symbol in the equalized output signal 10 with the corresponding symbol in the desired signal 18. Once the symbols are matched, the error signal 14 can be calculated in a variety of ways, such as, by non-limiting example, subtracting the equalized output signal 10 from the desired signal 18, averaging the equalized output signal 10 and the desired signal 18, or any other mathematical calculation.

Figure 2C:
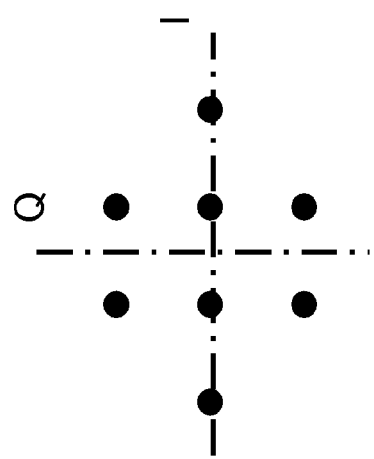
FIG. 2C is a signal constellation of an implementation of an 8-QAM digital communication system.
Figure 2A:
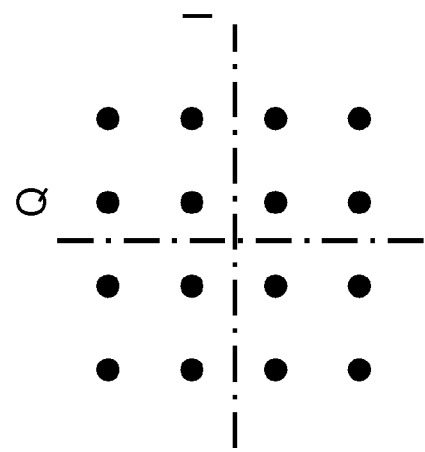
FIG. 2A is a signal constellation of an implementation of a 16-QAM digital communication system.

However, for implementations of QAM systems that utilize asymmetric constellation diagrams, by non-limiting example like the one illustrated in FIG. 2C, use of a LUT becomes more difficult. FIG. 2C illustrates an 8-QAM constellation diagram with three levels in the Q-axis and four levels in the I-axis. Because of the difference in the levels, two LUTs would be required to be able to look up the symbol positions along both the I-axis (I channel) and Q-axis (Q channel). Because implementing two LUTs may require a significantly greater amount of digital logic over that of a single LUT design, conventional QAM systems are typically constructed that implement only symmetric constellation diagrams. However, as is discussed at length in U.S. Pat. No. 7,254,188 to Cannon et al. entitled "Method and System for Modulating and Detecting High Datarate Symbol Communications," issued Aug. 7, 2007, previously incorporated by reference, the use of asymmetric constellation diagrams like those disclosed in this document may provide a number of performance advantages. However, implementing such a constellation diagram in a QAM system presents challenges.

Figure 3:
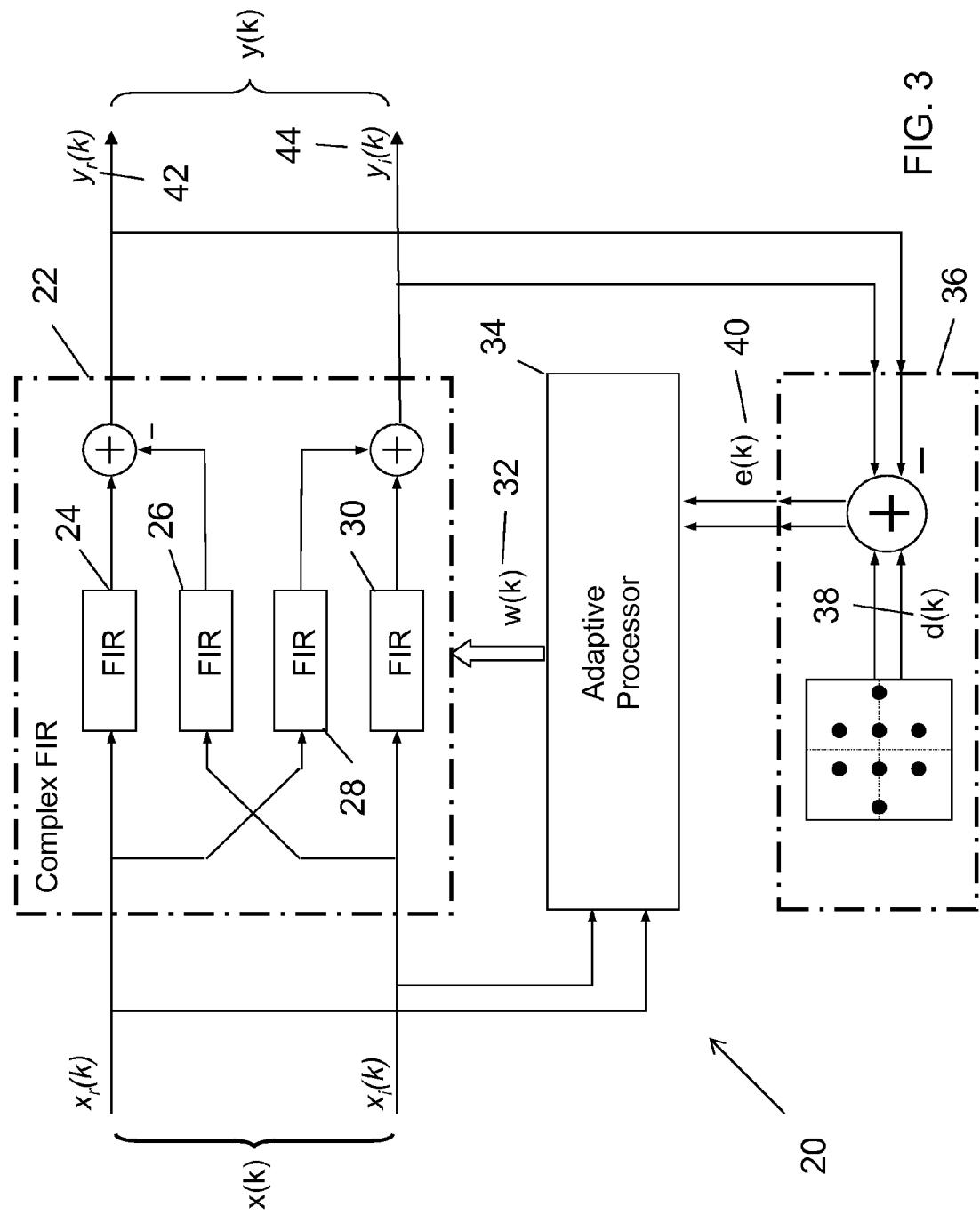
FIG. 3 is a block diagram of an implementation of an 8-QAM adaptive equalizer implementing the signal constellation illustrated in FIG. 2C.

Referring to FIG. 3, an implementation of an 8-QAM adaptive equalizer 20 is illustrated. As illustrated, the 8-QAM adaptive equalizer 20 includes a complex FIR 22 composed of four FIR filters 24, 26, 28, and 30 coupled together as shown. The complex FIR 22 receives filter coefficients 32 from the adaptive processor 34. The adaptive processor 34 calculates the filter coefficients 32 using one adaptive algorithm from a wide variety of potential adaptive algorithms, including, by non-limiting example, a least mean squares algorithm (LMS), a Newton LMS, a block LMS, a sign LMS, a normalized LMS, and any other algorithm capable of calculating filter coefficients 32. The adaptive process 34 for the specific example illustrated in FIG. 3 utilizes a least mean squares (LMS) algorithm to compute the filter coefficients 32. According to the LMS algorithm, a new filter coefficient 32 may be calculated as $$\overline{w}(k+1) = \overline{w}(k) - 2\mu \cdot e(k) \cdot \overline{x}(k)$$

where:

$$e(k) = d(k) - y(k)$$

$$y(k) = \sum_{n=0}^{N-1} \overline{w}^T(k)\overline{x}(k-n)$$

and e(k) is the error signal for the kth symbol, d(k) is the desired signal for the kth symbol, y(k) is the equalized output signal for the kth symbol, $\overline{w}(k)$ is the filter coefficient for the kth symbol, $\overline{w}(k+1)$ is the filter coefficient for the (k+1)st symbol, and μ is the step size.

For the 8-QAM adaptive equalizer implementation illustrated in FIG. 3, if filter coefficients 32 are adjusted using a LMS weight update, then the complex FIR filter 22 may adapt to the minimum mean squared error, assuming d(k) and x(k) to be wide-sense stationary signals. The step size, μ, may need to be chosen carefully in particular implementations to ensure stability and a good convergence rate. In general, the speed of adaptation may be inversely proportional to the step size.

As illustrated in FIG. 3, the 8-QAM adaptive equalizer 20 includes a slicer 36. While conventional slicers for QAM equalizers incorporate a LUT, the implementation of a slicer 36 illustrated in FIG. 3 does not, but instead relies upon one or more threshold values that define decision regions in each of the four quadrants of the constellation diagram utilized by the particular implementation of a QAM system. While any constellation diagram could be used, the implementation of a slicer 36 illustrated in FIG. 3 utilizes one or more threshold values determined from a constellation diagram like that illustrated in FIG. 2C. The one or more threshold values are stored either in or are accessible to the slicer 36 along with a plurality of desired values (desired signals) 38 that correspond to the model symbol locations (the ideal real and imaginary values along the I-axis and Q-axis, respectively) of the constellation diagram of FIG. 2C. When the slicer 36 is operated, it calculates an error signal 40 from a real equalized output signal 42, an imaginary equalized output signal 44, the one or more threshold values, and the plurality of desired values 38 by utilizing various implementations of methods of using a slicer for an adaptive equalizer.

Figure 4A:
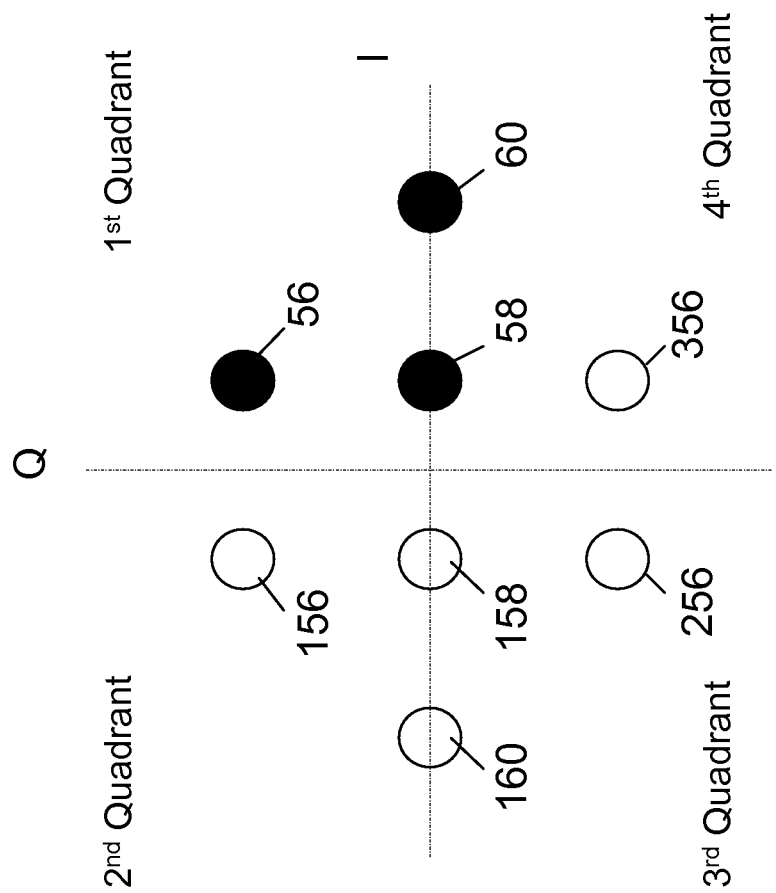
FIG. 4A illustrates the signal constellation illustrated in FIG. 2C folded into the first quadrant.

The one or more threshold values are calculated and stored using implementations of designing a slicer for an adaptive equalizer. Particular implementations of the method 45 may be utilized for 8-QAM adaptive equalizers, as is the implementation illustrated in FIGS. 4A, 4B, and 5. The method 45 illustrated in FIG. 5 includes folding a signal constellation to a quadrant (step 46). FIG. 4A illustrates graphically what the signal constellation looks like after the folding has taken place; the dark dots indicate the remaining symbol locations or constellation points and the white circles indicate those constellation points folded into the first quadrant. The step of folding the signal constellation may take place by a variety of methods, including, by non-limiting example, matrix algebra, addition, subtraction, division, or any other mathematical process. In this case, the process of folding the signal constellation is accomplished by visual and/or automated inspection to determine the distance between constellation points and their placement relative to the first quadrant. As illustrated in FIG. 4A, using this process, constellation point 156 becomes 56, point 160 becomes 60, point 158 becomes 58, point 256 becomes 356, and point 356 becomes 56. Folding into the first quadrant allows the system to require a minimum amount of digital logic resources which gives the system a cost benefit and less complexity in implementation.

Figure 5:
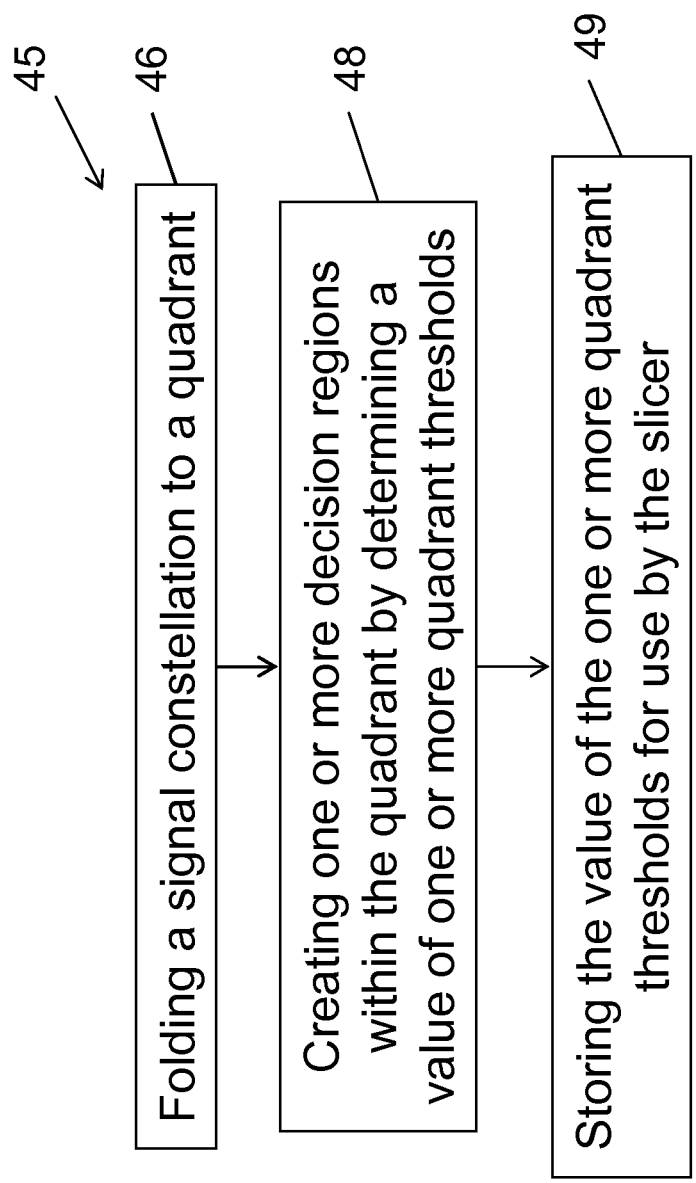
FIG. 5 is a flow chart of an implementation of a method of designing a slicer for an adaptive equalizer.

The method 45 illustrated in FIG. 5 also includes creating one or more decision regions 64, 66, and 68 within the quadrant by determining a value of one or more quadrant thresholds (step 48). FIG. 4B illustrates three quadrant thresholds 50, 52, and 54. The values of the quadrant thresholds 50, 52, and 54 may be calculated by a wide variety of algorithms, including, by non-limiting example, addition, subtraction, averaging, weighting, multiplying, dividing, and otherwise mathematically manipulating the Q-axis and I-axis values of the constellation points in the quadrant. In the implementation illustrated in FIG. 4B, the values of the quadrant thresholds 50, 52, and 54 are calculated by averaging the distance between nearby constellation points. Accordingly, quadrant threshold 50 is midway along the Q-axis between constellation point 56 and constellation point 58. Quadrant threshold 52 is midway along the I-axis between constellation point 58 and constellation point 60. Quadrant threshold 54 is midway along the Q- and I-axes between constellation points 56 and 60. Once the one or more values of the quadrant thresholds have been determined, the method 45 illustrated in FIG. 5 may include storing the one or more values of the quadrant thresholds (step 49). In the implementation illustrated in FIG. 4B, the values of the quadrant thresholds 52, 54, and 56 may be stored after they are determined. Depending upon the implementation of a method of designing a slicer, the values may be stored in the slicer in computer readable form, or in computer readable media accessible by the slicer.

Because quadrant threshold 52 is a straight line substantially parallel to the Q-axis, it may consist of a single I-axis value for a plurality of Q-axis values. Quadrant threshold 50, being a straight line substantially parallel to the I-axis, may include a single Q-axis value for a plurality of I-axis values. Quadrant threshold 54 is a function of both Q-axis and I-axis values. Implementations of a method of designing a slicer 45 may include quadrant thresholds that are any of a wide variety of functions of Q-axis and I-axis values, including, by non-limiting example, linear, quadratic, impulse, trigonometric, hyperbolic, logarithmic, and any other continuous or discontinuous mathematical functions. In particular implementations, at least two of two or more of the quadrant thresholds may meet at a single I-axis value and a single Q-axis value. In the implementation illustrated in FIG. 4B, the quadrant thresholds 50, 52, and 54 meet at point 62, defining three decision regions 64, 66, and 68. In the implementation illustrated, each of the decision regions 64, 66, and 68 includes a single constellation point; in other particular implementations, more than one point may be included in a particular decision region.

In particular implementations of methods of designing a slicer, values for one or more quadrant thresholds and one or more decision regions may be calculated in just one quadrant. In other implementations, values of for one or more quadrant thresholds and one or more decision regions may be calculated in two, three, or all four quadrants in the signal constellation. In these implementations, the method may include folding the signal constellation to a first quadrant and creating one or more decision regions within the first quadrant by determining the value of one or more first quadrant thresholds, then repeating the process for the second, third, and fourth quadrants, creating decision regions within each quadrant and determining values of one or more second, third, and fourth quadrant thresholds. The method may then include storing the values of the one or more first, second, third, and fourth quadrant thresholds.

Figure 6:
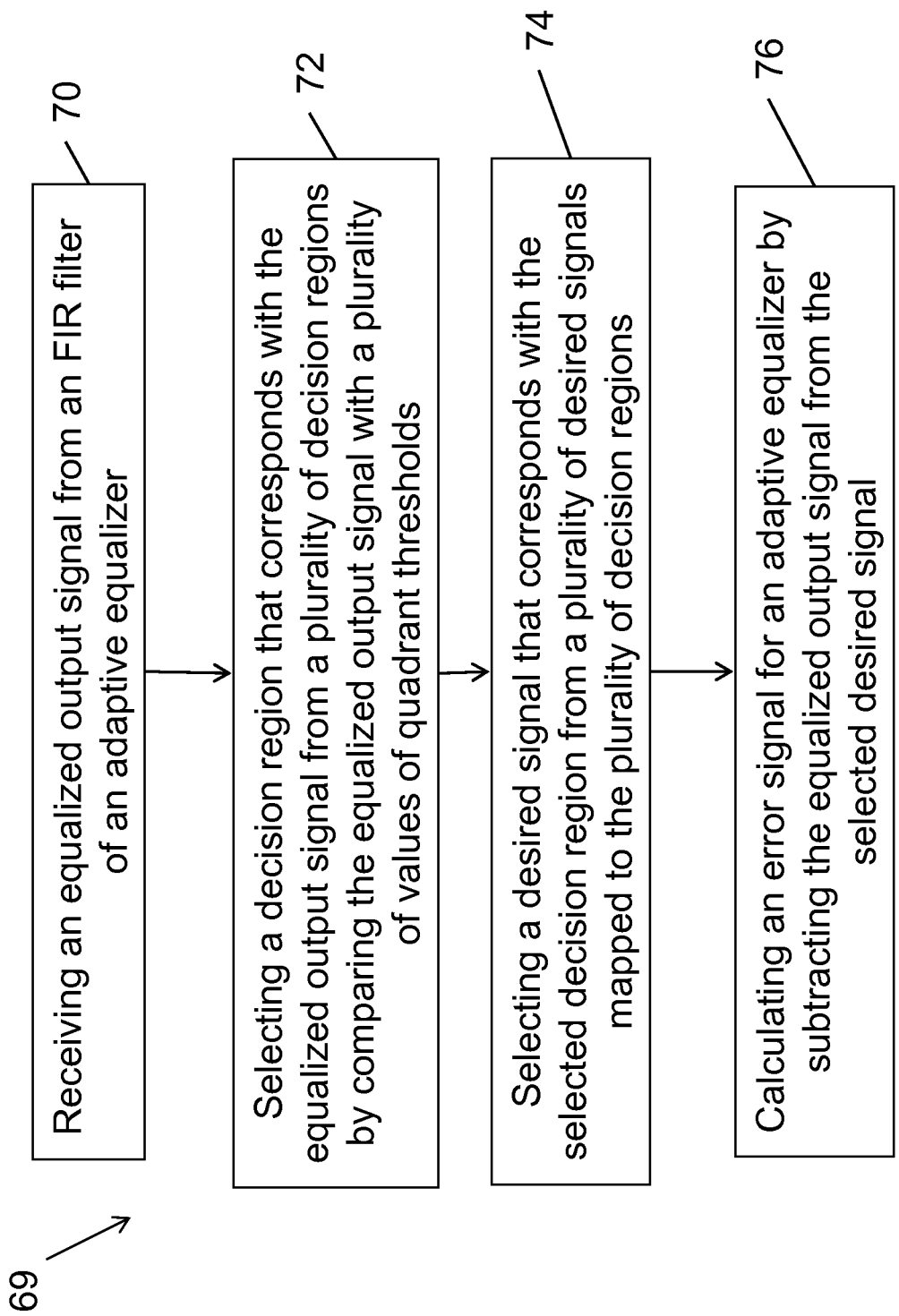
FIG. 6 is a flow chart of an implementation of a method of using a slicer for an adaptive equalizer.

After the values of the one or more quadrant thresholds have been determined and stored using an implementation of a method of designing a slicer, implementations of adaptive equalizers may utilize implementations of a method 69 of using a slicer. Referring to FIG. 6, implementations of a method 69 of using a slicer in an adaptive equalizer include receiving an equalized output signal from a filter of an adaptive equalizer (step 70) and selecting a decision region that corresponds with the equalized output signal from a plurality of decision regions by comparing the equalized output signal with a plurality of values of quadrant thresholds (step 72). The method may also include selecting a desired signal that corresponds with the selected decision region from a plurality of desired signals mapped to the plurality of decision regions (step 74), and calculating an error signal for the adaptive equalizer by subtracting the equalized output signal from the selected desired signal (step 76). In particular implementations of the method, the filter may be an FIR filter, but it could also be any of a wide variety of filters, including, by non-limiting example, linear, infinite impulse response, non-linear, and any other type of electronic filter. Also, particular implementations of the method may be used for 8-QAM adaptive equalizers.

In particular implementations of a method 69 of using a slicer, comparing the equalized output signal with a plurality of values of quadrant thresholds (step 72) may further include determining with which quadrant the equalized output signal corresponds. Determining with which quadrant the equalized output signal corresponds may also include retrieving one or more values of quadrant thresholds corresponding to the quadrant with which the equalized output signal corresponds. In implementations of the method, selecting the plurality of decision regions by comparing the equalized output signal with a plurality of values of quadrant thresholds (step 72) may include comparing an I-axis value and a Q-axis value of the equalized output signal with one or more I-axis values and one or more Q-axis values of the plurality of values of quadrant thresholds. Implementations may also include sending the error signal from the slicer to an adaptive processor.

Figure 7:
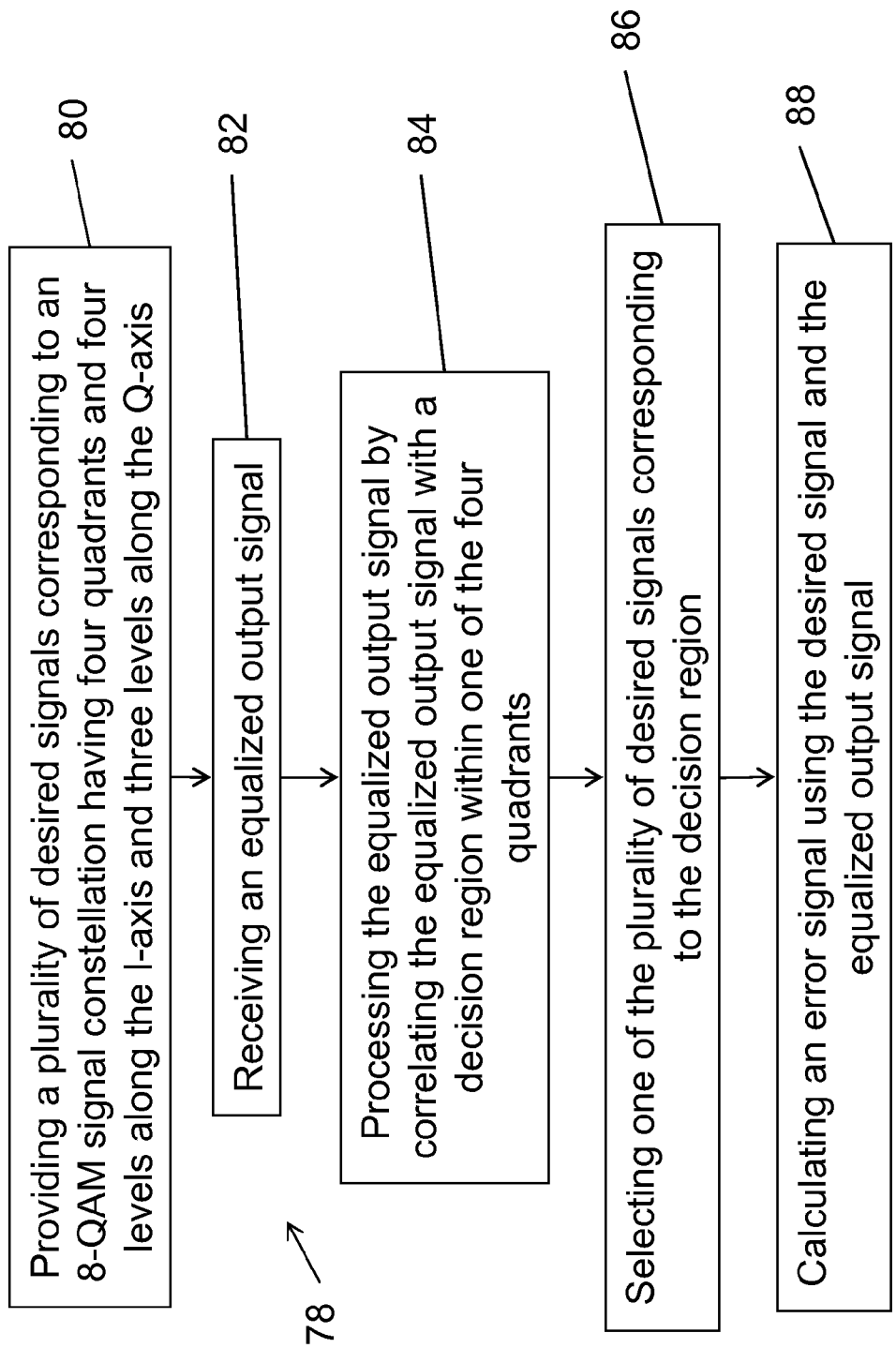
FIG. 7 is a flow chart of an implementation of a method of calculating an error signal for use in an adaptive equalizer.

Referring to FIG. 7, implementations of adaptive equalizer systems, including 8-QAM adaptive equalizer systems, may utilize implementations of a method 78 of calculating an error signal. The method 78 includes providing a plurality of desired signals corresponding to an 8-QAM signal constellation having four quadrants, four levels disposed along the I-axis, and three levels disposed along the Q-axis (step 80). The method also includes receiving an equalized output signal (step 82), processing the equalized output signal by correlating the equalized output signal with a decision region within one of the four quadrants (step 84), selecting one of a plurality of desired signals corresponding to the decision region (step 86), and calculating an error signal using the desired signal and the equalized output signal (step 88). While the particular implementation of the method 78 of calculating an error signal illustrated in FIG. 7 utilizes an asymmetric 8-QAM signal constellation like the one illustrated in FIG. 2C, other implementations of the method may utilize any other signal constellation type, symmetric or asymmetric, and any number of symbols or constellation points.

In particular implementations of a method 78 of calculating an error signal, calculating the error signal (step 88) may include subtracting the equalized output signal from the desired signal. Correlating the equalized output signal with a decision region (step 86) may include determining with which one of the four quadrants the equalized output signal corresponds and comparing an I-axis value and a Q-axis value of the equalized output signal with one or more quadrant thresholds corresponding to the determined quadrant. Particular implementations may also include transmitting the error signal to an adaptive processor.

Figure 8:
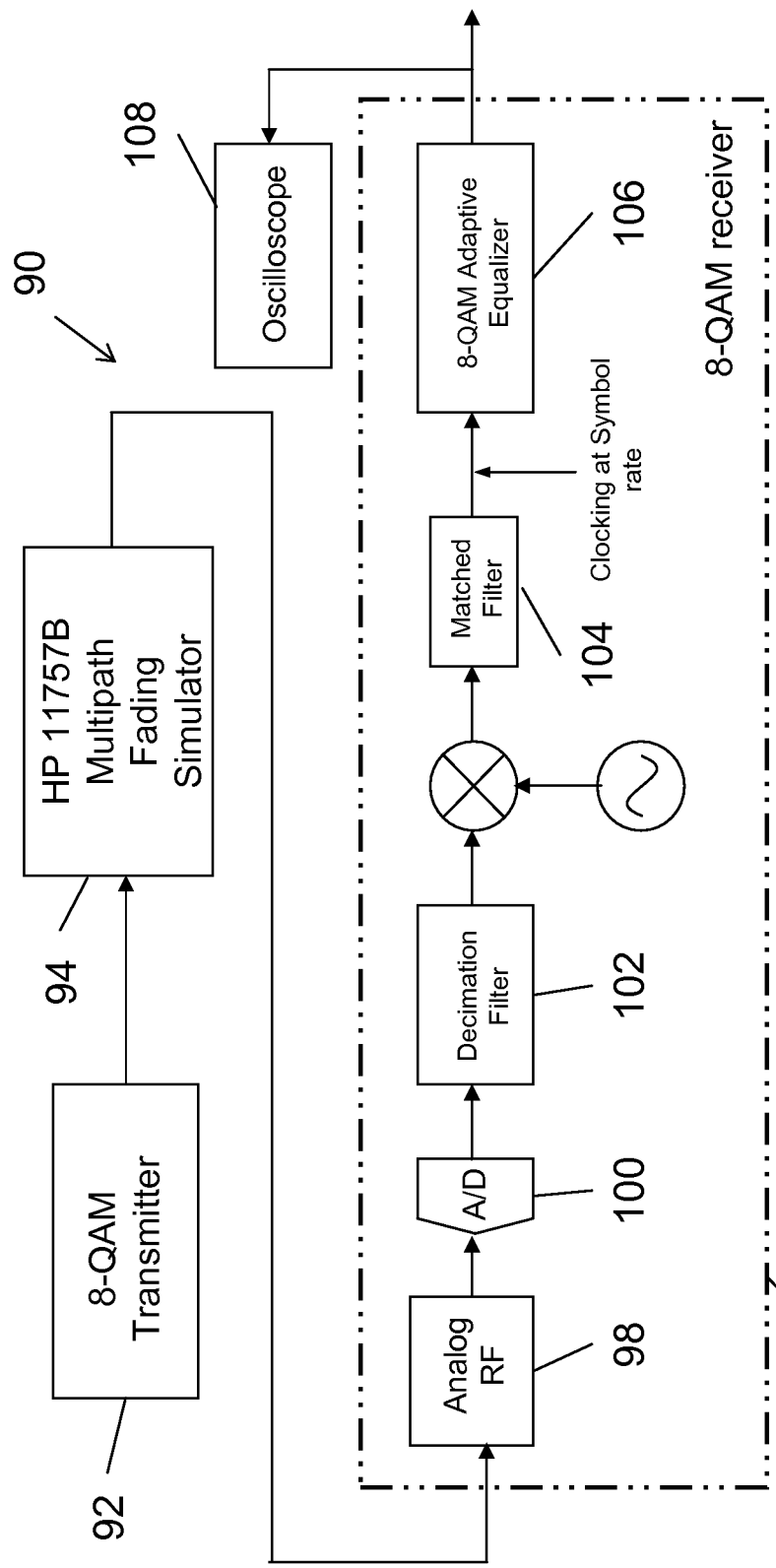
FIG. 8 is a block diagram of a test apparatus incorporating an implementation of an 8-QAM adaptive equalizer.

Referring to FIG. 8, an implementation of a test set up for testing an adaptive equalizer 90 is illustrated. In the implementation illustrated in FIG. 8, 8-QAM transmissions are being used, but such a test set up could be utilized for a QAM system involving any number of symbols or constellation points. For the particular implementation illustrated, an 8-QAM transmitter 92 sends random data that is 8-QAM modulated and tuned to 70 MHz. An HP 11757B multipath fading simulator test set 94 is used to simulate channel distortion by sloping the frequency response of the transmitted signal. The transmitted and distorted signal is received by an 8-QAM receiver 96 that is constructed to permit conventional frequency down-conversion with zero intermediate frequency (zero IF) into an analog radio frequency signal 98. The 8-QAM receiver 96 includes an analog to digital (A/D) converter 100 that samples this analog radio frequency signal 98 at a high sampling rate. A decimation filter 102 follows the A/D converter 100 to remove samples sufficient for a matched filter 104, carrier recovery circuit, and symbol timing circuit incorporated into the 8-QAM receiver 96. In the particular implementation illustrated in FIG. 8, the sampling rate at the output of the decimation filter 102 is four times the symbol clock. In particular implementations, the matched filter 104 (which may be a Nyquist filter) may be constructed as an FIR filter with a root-raised cosine characteristic similar to a root-raised cosine characteristic on the transmitter side. The input to the 8-QAM adaptive equalizer 106 is clocked at the symbol rate (that is, if the matched filter 104 is a Nyquist filter, the sampling takes place at the correct eye opening of the Nyquist filtered signal). Implementations of the 8-QAM adaptive equalizer 106 may be controlled by software as active (ON) or may be inactive (OFF).

During operation of an implementation of a test set up for testing an adaptive equalizer 90, when the 8-QAM equalizer 106 is inactive (OFF), and there is no distortion in the channel, the signal constellation being displayed on an oscilloscope 108 will show tight dots (or constellation points). If distortion is introduced into the channel by adjusting the HP 11757B test set 94, the signal constellation being displayed at the oscilloscope 108 will show fuzzy dots (or constellation points). When the 8-QAM equalizer 106 is active (ON), the fuzziness of the dots is eliminated and the dots become tight. When this behavior is observed on the oscilloscope 108, it confirms that the 8-QAM equalizer 106 is working.

Each of the methods described herein may be used for symmetric as well as asymmetric signal constellations. It applies to M-ary QAM as well as M-ary PSK and other techniques. However, symmetry can be exploited using a look up table approach which may be simpler than this approach for symmetric signal constellations. If the look-up table approach for symmetric signal constellations is impractical or impossible to implement for a particular situation, it is more beneficial to use a method disclosed in this disclosure which works for both symmetric and asymmetric signal constellations. It will be understood that implementations are not limited to the specific components disclosed herein, as virtually any components consistent with the intended operation of a method and/or system implementation for an adaptive equalizer may be utilized. Accordingly, for example, although particular slicers, filters, transmitters, and receivers may be disclosed, such components may comprise any shape, size, style, type, model, version, class, grade, measurement, concentration, material, weight, quantity, and/or the like consistent with the intended operation of a method and/or system implementation for an adaptive equalizer may be used.

In places where the description above refers to particular implementations of adaptive equalizers, it should be readily apparent that a number of modifications may be made without departing from the spirit thereof and that these implementations may be applied to other adaptive equalizers.

The invention claimed is:

1. An 8-QAM adaptive equalizer comprising:
a signal filter;
an adaptive processor configured to limit processing to one sample per symbol, the one sample per symbol collected at a time when a signal corresponds to at least one modulation constellation point, the adaptive processor coupled to the signal filter; and
a slicer coupled to the signal filter and the adaptive processor;
wherein the slicer is configured to utilize a plurality of desired signals corresponding to an 8-QAM signal constellation comprising four quadrants, four levels disposed along the I-axis, and three levels disposed along the Q-axis;
wherein the slicer is configured to output an error signal by receiving an equalized output signal, processing the equalized output signal by correlating the equalized output signal with a decision region within one of the four quadrants, selecting one of a plurality of desired signals corresponding to the decision region, and calculating the error signal using the selected desired signal and the equalized output signal; and
wherein the 8-QAM adaptive equalizer operates without correcting a symbol timing error in a symbol clock recovery circuit.

2. The 8-QAM adaptive equalizer of claim 1, wherein the slicer is configured to calculate the error signal by subtracting the equalized output signal from the desired signal.

3. The 8-QAM adaptive equalizer of claim 1, wherein the slicer is configured to correlate the equalized output signal with the decision region by determining with which one of the four quadrants the equalized output signal corresponds and by comparing an I-axis value and a Q-axis value of the equalized output signal with one or more quadrant thresholds corresponding to the determined quadrant.

4. A method of designing a slicer for an 8-QAM adaptive equalizer, the method comprising:
folding an 8-QAM signal constellation to a quadrant;
creating one or more decision regions within the quadrant by determining a value of one or more quadrant thresholds;
storing the value of the one or more quadrant thresholds for use by the slicer; and
processing an equalized output signal, using the slicer, by calculating, an error signal for an 8-QAM adaptive equalizer by correlating the equalized output signal with one of the one or more decision regions within the quadrant, selecting one of a plurality of desired signals corresponding to the one decision region, and calculating the error signal using the equalized output signal and the selected one of the plurality of desired signals corresponding to the 8-QAM signal constellation without correcting a symbol timing error in a symbol clock recovery circuit.

5. The method of claim 4, wherein the quadrant is a first quadrant and the value is a value of one or more first quadrant thresholds.

6. The method of claim 5, wherein the quadrant is one of a second quadrant, a third quadrant, and a fourth quadrant and the value is one of:
a value of one or more second quadrant thresholds,
a value of one or more third quadrant thresholds,
and a value of one or more fourth quadrant thresholds.

7. The method of claim 6, further comprising:
folding the signal constellation to the second quadrant;
creating one or more decision regions within in the second quadrant by determining the value of one or more second quadrant thresholds;
folding the signal constellation to the third quadrant;
creating one or more decision regions within in the third quadrant by determining the value of one or more third quadrant thresholds;

folding the signal constellation to the fourth quadrant;

creating one or more decision regions within in the fourth quadrant by determining the value of one or more fourth quadrant thresholds; and storing the value of the one or more first quadrant thresholds, the value of the one or more second quadrant thresholds, the value of the one or more third quadrant thresholds, and the value of the one or more fourth quadrant thresholds.

8. The method of claim 4, wherein two or more of two or more quadrant thresholds meet at a single I-axis value and a single Q-axis value.

9. The method of claim 4, wherein the value of the one or more quadrant thresholds comprises a single I-axis value for a plurality of Q-axis values.

10. The method of claim 4, wherein the value of the one or more quadrant thresholds comprises a single Q-axis value for a plurality of I-axis values.

11. The method of claim 4, wherein the value of the one or more quadrant thresholds is a function of both I-axis and Q-axis values.

12. The method of claim 11, wherein the function of both I-axis and Q-axis values is linear.

13. A method of using a slicer in an 8-QAM adaptive equalizer, the method comprising:

receiving an equalized output signal from a finite impulse response (FIR) filter of an 8-QAM adaptive equalizer;

selecting a decision region that corresponds with the equalized output signal from a plurality of decision regions by comparing the equalized output signal with a plurality of values of quadrant thresholds using only one sample per symbol of the equalized output signal, the one sample per symbol having been collected at a time at which the equalized output signal corresponds to at least one modulation constellation point;

selecting a desired signal that corresponds with the selected decision region from a plurality of desired signals mapped to the plurality of decision regions; and calculating an error signal for the 8-QAM adaptive equalizer by subtracting the equalized output signal from the selected desired signal without correcting a symbol timing error in a symbol clock recovery circuit.

14. The method of claim 13, wherein comparing the equalized output signal with a plurality of values of quadrant thresholds further comprises determining with which quadrant the equalized output signal corresponds.

15. The method of claim 14, wherein determining with which quadrant the equalized output signal corresponds further comprises retrieving one or more values of quadrant thresholds corresponding to the quadrant with which the equalized output signal corresponds.

16. The method of claim 15, wherein selecting the plurality of decision regions by comparing the equalized output signal with a plurality of values of quadrant thresholds further comprises comparing an I-axis value and a Q-axis value of the equalized output signal with one or more I-axis values and one or more Q-axis values of the plurality of values of quadrant thresholds.

17. The method of claim 13, further comprising sending the error signal to an adaptive processor.

18. A method of calculating an error signal for an 8-QAM adaptive equalizer, the method comprising:

providing a plurality of desired signals corresponding to an 8-QAM signal constellation comprising four quadrants, four levels disposed along the I-axis, and three levels disposed along the Q-axis;

receiving an equalized output signal;

processing the equalized output signal by correlating the equalized output signal with a decision region within one of the four quadrants using only one sample per symbol of the equalized output signal, the one sample per symbol collected at a time when the equalized output signal corresponds to at least one modulation constellation point;

selecting one of the plurality of desired signals corresponding to the decision region; and calculating an error signal using the selected desired signal and the equalized output signal without correcting a symbol timing error in a symbol clock recovery circuit.

19. The method of claim 18, wherein calculating the error signal comprises subtracting the equalized output signal from the desired signal.

20. The method of claim 18, wherein correlating the equalized output signal with a decision region further comprises determining with which one of the four quadrants the equalized output signal corresponds and comparing an I-axis value and a Q-axis value of the equalized output signal with one or more quadrant thresholds corresponding to the determined quadrant.

21. The method of claim 18, further comprising transmitting the error signal to an adaptive processor.

* * * * *